(12) United States Patent  
Nishiyama et al.

(10) Patent No.: US 7,976,973 B2  
(45) Date of Patent: Jul. 12, 2011

(54) SPIRALLY WOUND BATTERY

(75) Inventors: Shoichi Nishiyama, Fukushima (JP); Hiroshi Inoue, Fukushima (JP)

(73) Assignee: Sony Corporation, Tokyo (JP)

( * ) Notice: Subject to any disclaimer, the term of this patent is extended or adjusted under 35 U.S.C. 154(b) by 819 days.

(21) Appl. No.: 11/750,100

(22) Filed: May 17, 2007

(65) Prior Publication Data

US 2008/0176140 A1    Jul. 24, 2008

(30) Foreign Application Priority Data

May 23, 2006   (JP) ................................ 2006-142723  
Mar. 14, 2007  (JP) ................................ 2007-064996

(51) Int. Cl.  
*H01M 4/00* (2006.01)

(52) U.S. Cl. ........... 429/94; 429/233; 429/245; 429/211

(58) Field of Classification Search ............... 429/94, 429/233, 245, 209, 218.1, 211  
See application file for complete search history.

(56) References Cited

U.S. PATENT DOCUMENTS 5,683,834 A * 11/1997 Fujimoto et al. ............ 429/221

FOREIGN PATENT DOCUMENTS

| JP | 08-130035 | 5/1996 |
| JP | 11-135105 | 5/1999 |
| JP | 2001-222995 | 8/2001 |
| JP | 2002-008709 | 1/2002 |
| JP | 2002-222651 | 8/2002 |
| JP | 2003-045474 | 2/2003 |
| JP | 2003-187871 | 7/2003 |
| JP | 2006-024464 | 1/2006 |

OTHER PUBLICATIONS

Japanese Office Action issued on Apr. 15, 2008.

* cited by examiner

*Primary Examiner* — Raymond Alejandro  
(74) *Attorney, Agent, or Firm* — SNR Denton US LLP

(57) ABSTRACT

A battery includes a spirally wound electrode body in which a cathode and an anode are layered with a separator in between and spirally wound. The spirally wound electrode body is attached with at least one lead on the spirally-winding center side. The cathode has a cathode current collector having a pair of opposed faces, an outer-face cathode active material layer provided on the spirally-winding outer face side of the cathode current collector, and an inner-face cathode active material layer provided on the spirally-winding inner face side thereof. A thickness of the inner-face cathode active material layer is smaller than a thickness of the outer-face cathode active material layer. An outer face active material region provided with only the outer-face cathode active material layer is formed to be overlapped with the lead on the spirally-winding center side of the cathode.

3 Claims, 8 Drawing Sheets

SPIRALLY WOUND BATTERY

CROSS REFERENCES TO RELATED APPLICATIONS

The present invention contains subject matter related to Japanese Patent Application JP 2006-142723 filed in the Japanese Patent Office on May 23, 2006, and Japanese Patent Application JP 2007-064996 filed in the Japanese Patent Office on Mar. 14, 2007, the entire contents of which being incorporated herein by references.

BACKGROUND OF THE INVENTION

1. Field of the Invention

The present invention relates to a battery including a spirally wound electrode body in which a cathode and an anode are layered with a separator in between and spirally wound.

2. Description of the Related Art

In recent years, many portable electronic devices such as a combination camera (Videotape Recorder), a mobile phone, and a notebook personal computer have been introduced. As a power source for such portable electronic devices, development of a small and light-weight battery having the high energy density, in particular the secondary battery has been strongly demanded. As a secondary battery to meet such a demand, for example, a lithium secondary battery using lithium as an electrode reactant has been practically used. However, as the mobile devices have been sophisticated in these years, the higher capacity thereof has been demanded.

As a method to realize the high capacity, for example, the amount of the active material filled in the battery may be increased. For example, in a lithium secondary battery having a structure in which a cathode and an anode provided with an active material layer on the both faces of the current collector are layered with a separator in between and spirally wound, when the thickness of the active material layer is increased, the ratio of the current collector and the separator in the battery is decreased, the filling amount of the active material is increased, and thus the capacity can be improved. However, when the thickness of the active material layer is increased, there is a disadvantage that cracks and breaks are easily generated in the active material layer when the lamination is spirally wound. Therefore, for example, it is proposed that the stress is relaxed by, for example, setting the thickness of the active material layer on the spirally-winding inner face side smaller than that of the active material layer on the spirally-winding outer face side (for example, refer to Japanese Unexamined Patent Application Publication No. 8-130035).

SUMMARY OF THE INVENTION

However, even when the thickness of the active material layer on the spirally-winding inner face side is reduced, there is the following disadvantage. That is, on the spirally-winding center side with the small diameter in the case of a cylinder type battery and on the bending portion in the case of a square type battery, it is difficult to sufficiently relax the stress, and cracks and breaks are generated. In particular, such a disadvantage is easily generated in the cathode, and such a disadvantage significantly occurs when a high capacity material such as tin and silicon is used for the anode, since the thickness of the cathode active material layer is increased.

In view of the foregoing, in the invention, it is desirable to provide a battery free from cracks and breaks even when the thickness of the cathode is increased.

According to an embodiment of the invention, there is provided a first battery including a spirally wound electrode body in which a cathode and an anode are layered with a separator in between and spirally wound, wherein the spirally wound electrode body is attached with at least one lead on the spirally-winding center side, the cathode has a cathode current collector having a pair of opposed faces, an outer-face cathode active material layer provided on the spirally-winding outer face side of the cathode current collector, and an inner-face cathode active material layer provided on the spirally-winding inner face side thereof, a thickness of the inner-face cathode active material layer is smaller than a thickness of the outer-face cathode active material layer, and an outer face active material region provided with only the outer-face cathode active material layer is formed to be overlapped with the lead on the spirally-winding center side of the cathode.

According to an embodiment of the invention, there is provided a second battery including a spirally wound electrode body in which a cathode and an anode are layered with a separator in between and spirally wound, wherein the spirally wound electrode body has a planular shape including a pair of opposed bending portions and a flat portion provided between the pair of bending portions, the cathode has a cathode current collector having a pair of opposed faces, an outer-face cathode active material layer provided on the spirally-winding outer face side of the cathode current collector, and an inner-face cathode active material layer provided on the spirally-winding inner face side thereof, a thickness of the inner-face cathode active material layer is smaller than a thickness of the outer-face cathode active material layer, and an outer face active material region provided with only the outer-face cathode active material layer is formed in the bending portion on the spirally-winding center side of the cathode.

According to the first battery of the embodiment of the invention, the outer face active material region provided with only the outer-face cathode active material layer is provided to be overlapped with the lead on the spirally-winding center side of the cathode. Further, according to the second battery of the embodiment of the invention, the outer face active material region is provided in the bending portion on the spirally-winding center side of the cathode. Therefore, a step due to the lead or a bending in the bending portion is relaxed by the outer-face cathode active material layer, and effects on the inner-face cathode active material layer can be reduced. Thus, even when the thickness of the cathode is increased, the generation of cracks or breaks can be prevented on the spirally-winding center side. Consequently, the capacity can be improved.

Other and further objects, features and advantages of the invention will appear more fully from the following description.

DETAILED DESCRIPTION OF THE PREFERRED EMBODIMENTS

Embodiments of the invention will be hereinafter described in detail with reference to the drawings.

First Embodiment

Figure 1:
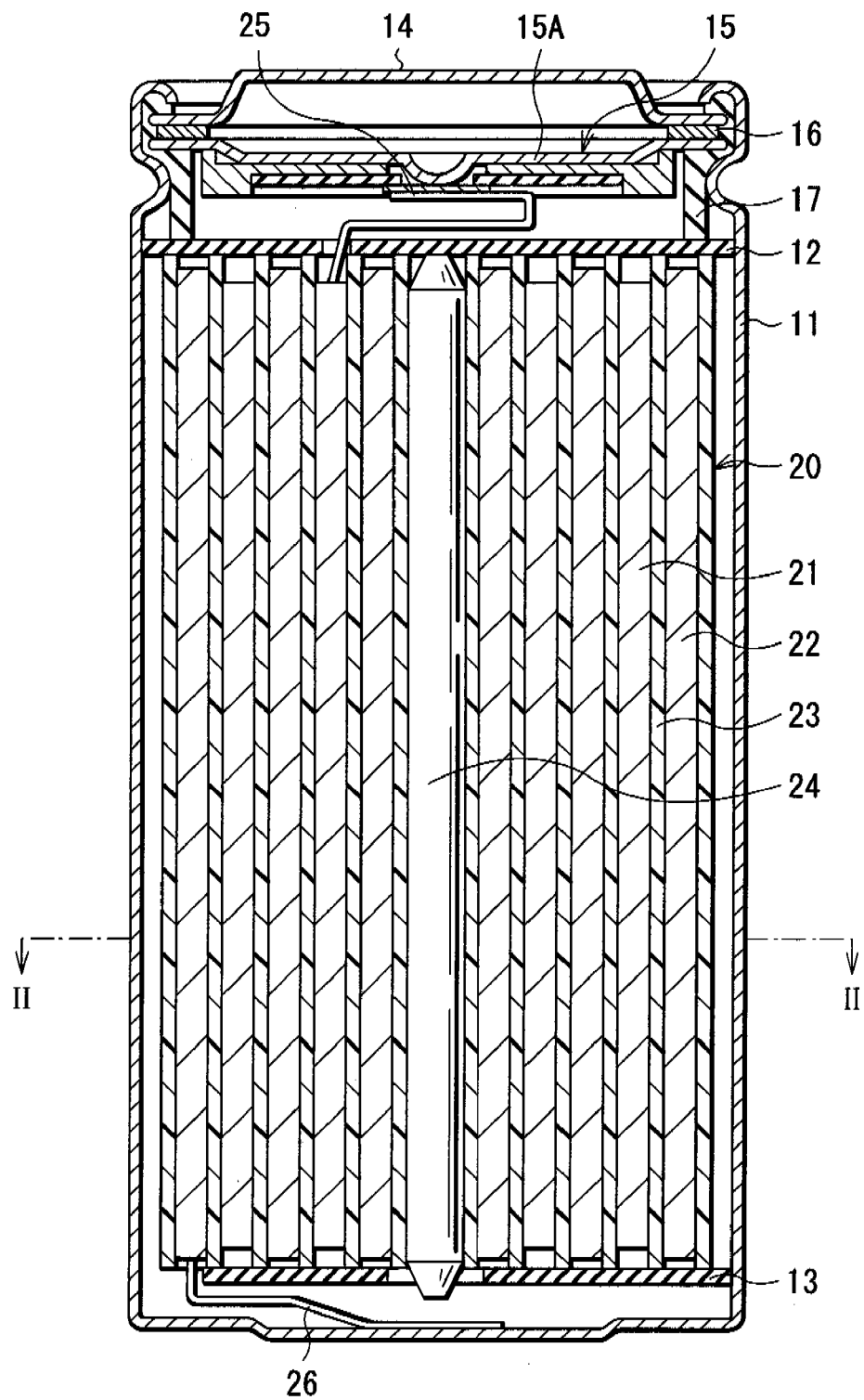
FIG. 1 is a cross section showing a structure of a secondary battery according to a first embodiment of the invention.

FIG. 1 shows a structure of a secondary battery according to a first embodiment of the invention. The secondary battery is a so-called cylinder type battery, and has a spirally wound electrode body 20 inside a battery can 11 in the shape of an approximately hollow cylinder. The battery can 11 is made of, for example, iron (Fe) plated with nickel (Ni). One end of the battery can 11 is closed, and the other end thereof is opened. Inside the battery can 11, a pair of insulating plates 12 and 13 is respectively arranged perpendicular to the winding periphery face, so that the spirally wound electrode body 20 is sandwiched between the insulating plates 12 and 13.

At the open end of the battery can 11, a battery cover 14, and a safety valve mechanism 15 and a PTC (Positive Temperature Coefficient) device 16 provided inside the battery cover 14 are attached by being caulked with a gasket 17. Inside of the battery can 11 is hermetically sealed. The battery cover 14 is, for example, made of a material similar to that of the battery can 11. The safety valve mechanism 15 is electrically connected to the battery cover 14 through the PTC device 16. When the internal pressure of the battery becomes a certain level or more by internal short circuit, external heating or the like, a disk plate 15A flips to cut the electrical connection between the battery cover 14 and the spirally wound electrode body 20. When temperatures rise, the PTC device 16 limits a current by increasing the resistance value to prevent abnormal heat generation due to a large current. The gasket 17 is made of, for example, an insulating material and its surface is coated with asphalt.

Figure 2:
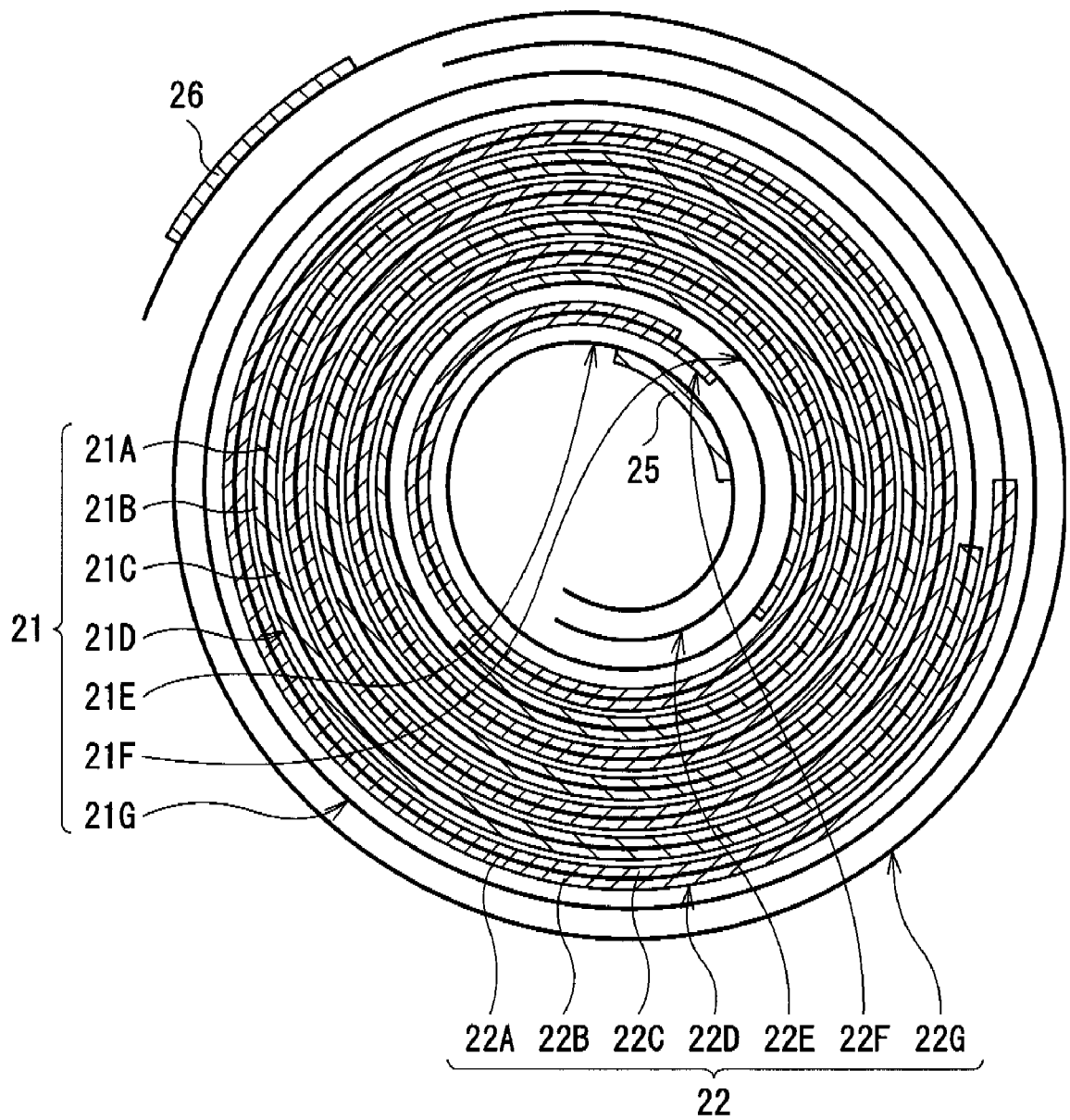
FIG. 2 is a cross section showing a structure taken along line II-II of a spirally wound electrode body shown in FIG. 1.

FIG. 2 shows a cross sectional structure taken along line II-II of the spirally wound electrode body 20 shown in FIG. 1. In the spirally wound electrode body 20, a strip-shaped cathode 21 and a strip-shaped anode 22 are layered with a separator 23 in between and spirally wound cylindrically. A center pin 24 is inserted in the center of the spirally wound electrode body 20. In FIG. 2, the separator 23 is omitted. A lead 25 made of aluminum (Al) or the like is connected to the cathode 21. A lead 26 made of nickel or the like is connected to the anode 22. The lead 25 is electrically connected to the battery cover 14 by being attached to the safety valve mechanism 15. The lead 26 is attached to and electrically connected to the battery can 11.

The cathode 21 has, for example, a cathode current collector 21A having a pair of opposed faces, an outer-face cathode active material layer 21B provided on the spirally-winding outer face side of the cathode current collector 21A, and an inner-face cathode active material layer 21C provided on the spirally-winding inner face side of the cathode current collector 21A. In the cathode 21, a both-faces active material region 21D provided with the outer-face cathode active material layer 21B and the inner-face cathode active material layer 21C is formed. The thickness of the inner-face cathode active material layer 21C is smaller than that of the outer-face cathode active material layer 21B. The reason thereof is that the inner-face cathode active material layer 21C is more easily applied with stress, and easily has cracks and breaks. Where the thickness of the outer-face cathode active material layer 21B is expressed as T21B, the thickness of the inner-face cathode active material layer 21C is expressed as T21C, and the total thickness T21 of the outer-face cathode active material layer 21B and the inner-face cathode active material layer 21C is expressed as T21B+T21C, the thickness T21B of the outer-face cathode active material layer 21B is preferably, for example, in the range of $0.5 \times T21 < T21B < 0.6 \times T21$, and the thickness T21C of the inner-face cathode active material layer 21C is preferably, for example, in the range of $0.4 \times T21 < T21C < 0.5 \times T21$. In such a range, the capacity can be improved while cracks and breaks can be prevented.

The porosities of the outer-face cathode active material layer 21B and the inner-face cathode active material layer 21C are preferably within the range from 20% to 27%. In this range, cracks and breaks are suppressed and the capacity is improved. Further, high capacity can be kept in case of outputting with high load current.

The porosity (%) is a value subtracts the filling rate (%) from 100. The filling rate is percentage of volume of the materials (cathode active material or the like) forming the outer-face cathode active material layer 21B and the inner-face cathode active material layer 21C in the volumes thereof. For example, the filling rate can be obtained from the volumes of the outer-face cathode active material layer 21B and the inner-face cathode active material layer 21C per unit weight and the volume of the materials (total volume of the cathode active material or the like) per unit weight. The volume of the outer-face cathode active material layer 21B and the inner-face cathode active material layer 21C is represented by reciprocal number (unit weight). The volume of the materials is calculated by the ratio and the true density of each material. For example, in the case where each material is the cathode active material, the electrical conductor and the binder, when the sum of the ratios of the cathode active material, the electrical conductor and the binder is 1, the volume is expressed as (ratio of the cathode active material/true density of the cathode active material)+(ratio of the electrical conductor/true density of the electrical conductor)+(ratio of the binder/true density of the binder).

On the spirally-winding center side of the cathode 21, for example, a both-faces exposed region 21E in which the outer-face cathode active material layer 21B and the inner-face cathode active material layer 21C are not provided and the both faces of the cathode current collector 21A are exposed is formed, and the lead 25 is attached thereto. Further, on the spirally-winding center side of the cathode 21, an outer face active material region 21F provided with only the outer-face cathode active material layer 21B is formed between the both-faces exposed region 21E and the both-faces active material region 21D. The outer face active material region 21F is formed at least in a position where the outer face active material region 21F is overlapped with the lead 25. Thereby, a step due to the lead 25 is relaxed by the outer cathode active material layer 21B, and influence on the inner-face cathode active material layer 21C is decreased.

Figure 3:
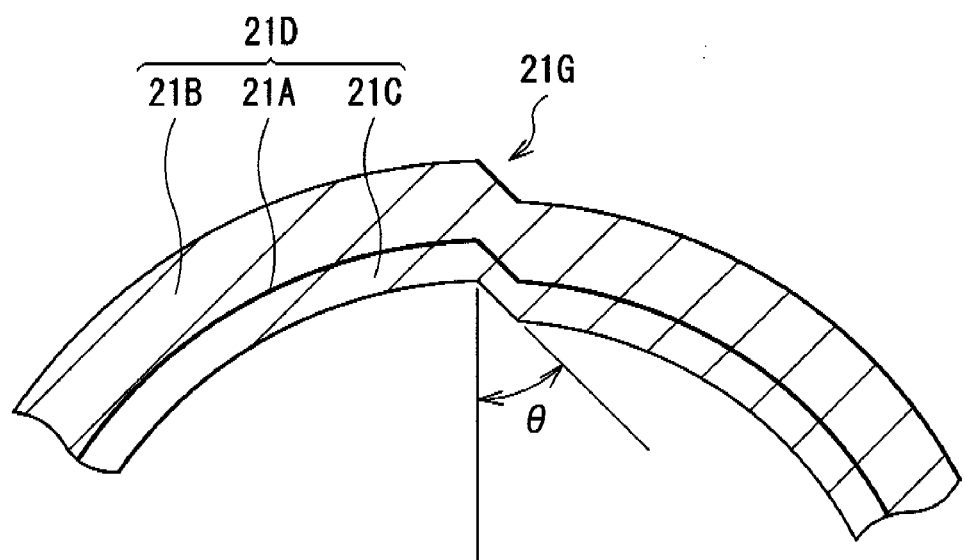
FIG. 3 is a cross section showing an enlarged part of the spirally wound electrode body shown in FIG. 2.

That is, as shown in FIG. 3, the both-faces active material region 21D is bent at the position where the both-faces active material region 21D is overlapped with the lead 25, resulting in a step 21G. At this time, when the outer face active material region 21F is provided, as the thickness of the outer-face cathode active material layer 21B of the outer face active material region 21F is increased, the diameter from the spirally-winding center of the spirally wound electrode body 20 to the both-faces active material region 21D is increased. Thereby, the bending angle θ of the step 21G is increased, and thus the stress is relaxed.

If necessary, a both-faces exposed region 21H in which the both faces of the cathode current collector 21A are exposed may be formed on the spirally-winding outer circumferential side of the cathode 21 as well. Though not shown, an inner face active material region provided with only the inner-face cathode active material layer 21C may be formed.

The cathode current collector 21A is, for example, made of a metal foil such as an aluminum foil, a nickel foil, and a stainless foil. The outer-face cathode active material layer 21B and the inner-face cathode active material layer 21C contain, for example, as a cathode active material, one or more cathode materials capable of inserting and extracting lithium as an electrode reactant. If necessary, the outer-face cathode active material layer 21B and the inner-face cathode active material layer 21C may also contain an electrical conductor, a binder or the like. As the cathode material capable of inserting and extracting lithium, for example, a metal chalcogenide containing no lithium such as titanium sulfide ($TiS_2$), molybdenum sulfide ($MoS_2$), niobium selenide ($NbSe_2$), and vanadium oxide ($V_2O_5$), or a lithium-containing compound containing lithium can be cited.

Specially, some of the lithium-containing compounds are preferably used, since thereby the high voltage and the high energy density can be obtained. As such a lithium-containing compound, for example, a complex oxide containing lithium and a transition metal element or a phosphate compound containing lithium and a transition metal element can be cited. In particular, a compound containing at least one of cobalt (Co), nickel, manganese (Mn), and iron is preferable, since thereby the higher capacity can be obtained. The chemical formula thereof is expressed by, for example, $Li_xMIO_2$ or $Li_yMIIPO_4$. In the formula, MI and MII represent one or more transition metal elements. Values of x and y vary according to charge and discharge states of the battery, and are generally in the range of $0.05 \leq x \leq 1.10$ and $0.05 \leq y \leq 1.0$.

As a specific example of the complex oxide containing lithium and a transition metal element, a lithium-cobalt complex oxide ($Li_xCoO_2$), a lithium-nickel complex oxide ($Li_xNiO_2$), a lithium-nickel-cobalt complex oxide ($Li_xNi_{1-z}Co_zO_2$ ($z<1$)), lithium-manganese complex oxide having a spinel structure ($LiMn_2O_4$) and the like can be cited. As a specific example of the phosphate compound containing lithium and a transition metal element, for example, lithium-iron phosphate compound ($LiFePO_4$) or a lithium-iron-manganese phosphate compound ($LiFe_{1-v}Mn_vPO_4$ ($v<1$)) can be cited.

The anode 22 has, for example, an anode current collector 22A having a pair of opposed faces, an outer face anode active material layer 22B provided on the spirally-winding outer face side of the anode current collector 22A, and an inner face anode active material layer 22C provided on the spirally-winding inner face side of the anode current collector 22A. In the same manner as in the cathode 21, in the anode 22, a both-faces active material region 22D provided with the outer face anode active material layer 22B and the inner face anode active material layer 22C is formed. Arrangement is made so that at least in part, the outer face anode active material layer 22B faces to the inner-face cathode active material layer 21C, and the inner face anode active material layer 22C faces the outer-face cathode active material layer 21B. The thickness of the outer face anode active material layer 22B may be the same as that of the inner face anode active material layer 22C, but is preferably smaller than that of the inner face anode active material layer 22C. Since the outer face anode active material layer 22B faces to the inner-face cathode active material layer 21C, the capacity per unit area of the outer face anode active material layer 22B may be smaller than that of the inner face anode active material layer 22C. Thus, the thickness of the outer face anode active material layer 22B may be decreased by just that much. In the result, a useless portion of the volume can be eliminated, and the capacity can be more improved.

If necessary, on the spirally-winding center side of the anode 22, a both-faces exposed region 22E in which the outer face anode active material layer 22B and the inner face anode active material layer 22C are not provided and the both faces of the anode current collector 22A are exposed may be formed. Further, on the spirally-winding center side of the anode 22, an one-face region 22F provided with only the outer face anode active material layer 22B or the inner face anode active material layer 22C may be formed between the both-faces exposed region 22E and the both-faces active material region 22D.

For example, a both-faces exposed region 22G in which the both faces of the anode current collector 22A are exposed is formed on the spirally-winding outer circumferential side of the anode 22, and the lead 26 is attached thereto. Though not shown, an inner face active material region provided with only the inner face anode active material layer 22C may be formed on the spirally-winding outer circumferential side of the anode 22.

The anode current collector 22A is made of, for example, a metal foil such as a copper (Cu) foil, a nickel foil, and a stainless foil. The outer face anode active material layer 22B and the inner face anode active material layer 22C contain, as an anode active material, for example, at least one or more of an anode material capable of inserting and extracting lithium as an electrode reactant, and may contain an electrical conductor, a binder or the like if necessary. As the anode material capable of inserting and extracting lithium, for example, a carbon material such as natural graphite, artificial graphite, non-graphitizable carbon, and graphitizable carbon, or a material containing at least one of metal elements and metalloid elements capable of forming an alloy with lithium as an element can be cited.

Specially, the anode material containing a metal element or a metalloid element as an element is preferably used, since the capacity can be thereby improved. As such an anode material, a simple substance, an alloy, or a compound of metal elements or metalloid elements, or a material having one or more phases thereof at least in part can be cited. In the invention, alloys also include an alloy containing one or more metal elements and one or more metalloid elements, in addition to an alloy including two or more metal elements. Further, an alloy may contain nonmetallic elements. The texture thereof may be a solid solution, a eutectic crystal (eutectic mixture), an intermetallic compound, or a texture in which two or more of the foregoing textures coexist.

As such a metal element or such a metalloid element composing the anode material, magnesium (Mg), boron (B), aluminum, gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), platinum (Pt) or the like can be cited. Specially, silicon or tin is preferable.

Specially, as such an anode material, a CoSnC-containing material containing tin, cobalt, and carbon (C) as an element, or a FeSnC-containing material containing tin, iron, and carbon as an element is preferable. Thereby, the high energy density can be obtained, and the superior cycle characteristics can be obtained. The carbon content in the CoSnC-containing material is preferably from 16.8 wt % to 24.8 wt %, and the ratio of cobalt to the total of tin and cobalt is preferably from 30 wt % to 45 wt %. The carbon content in the FeSnC-containing material is preferably from 11.9 wt % to 29.7 wt %, and the ratio of iron to the total of tin and iron is preferably from 26.4 wt % to 48.5 wt %. In such a range, the higher characteristics can be obtained.

The CoSnC-containing material and the FeSnC-containing material may further contain other element if necessary. As other element for the CoSnC-containing material, for example, silicon, iron, nickel, chromium (Cr), indium, niobium (Nb), germanium, titanium (Ti), molybdenum (Mo), aluminum, phosphorus (P), gallium, or bismuth is preferable, and two or more thereof may be contained. As other element for the FeSnC-containing material, for example, at least one selected from the group consisting of aluminum, titanium, vanadium (V), chromium, niobium, and tantalum (Ta) and at least one selected from the group consisting of cobalt, nickel, copper, zinc, gallium, and indium are preferable. In addition, silver is also preferable.

The CoSnC-containing material preferably has a phase containing tin, cobalt, and carbon. The phase preferably has a structure with low crystallinity or an amorphous structure. Similarly, the FeSnC-containing material preferably has a phase containing tin, iron, and carbon. The phase preferably has a structure with low crystallinity or an amorphous structure. Further, it is preferable that in the CoSnC-containing material and the FeSnC-containing material, at least part of carbon as the element is bonded to the metal element or the metalloid element as other element. The reason thereof is as follows. Lowered cycle characteristics may be caused by cohesion or crystallization of tin or the like. Such cohesion or crystallization can be prevented by bonding carbon to other element.

The separator 23 separates the cathode 21 from the anode 22, prevents current short circuit due to contact of both electrodes, and passes lithium ions. The separator 23 is made of, for example, a porous film made of a synthetic resin such as polytetrafluoroethylene, polypropylene, and polyethylene, or a ceramics porous film. The separator 23 may have a structure in which two or more of the foregoing porous films are layered.

For example, an electrolytic solution is impregnated in the separator 23. The electrolytic solution contains, for example, a solvent and an electrolyte salt. As a solvent, for example, a nonaqueous solvent such as ethylene carbonate, propylene carbonate, dimethyl carbonate, diethyl carbonate, methyl ethyl carbonate, 1,2-dimethoxyethane, 1,2-diethoxyethane, γ-butyrolactone, γ-valerolactone, tetrahydrofuran, 2-methyl tetrahydrofuran, 1,3-dioxolane, 4-methyl-1,3-dioxolane, 1,3-dioxole-2-one, 4-vinyl-1,3-dioxolane-2-one, 4-fluoro-1,3-dioxolane-2-one, diethyl ether, sulfolane, methylsulfolane, acetonitrile, propionitrile, anisole, ester acetate, ester butyrate, ester propionate, fluoro benzene, and ethylene sulfide can be cited. As the electrolyte salt, for example, a lithium salt such as $LiPF_6$, $LiBF_4$, $LiClO_4$, $LiAsF_6$, $LiN(CF_3SO_2)_2$, $LiN(C_2F_5SO_2)_2$, $LiC(CF_3SO_2)_3$, $LiB(C_6H_5)_4$, $LiB(C_2O_4)_2$, $LiCF_3SO_3$, $LiCH_3SO_3$, LiCl, and LiBr can be cited. As the solvent and the electrolyte salt, one of the foregoing may be used singly, or two or more thereof may be used by mixing them.

The secondary battery can be manufactured, for example, as follows.

First, the outer-face cathode active material layer 21B and the inner-face cathode active material layer 21C are formed on the cathode current collector 21A to form the cathode 21. The outer-face cathode active material layer 21B and the inner-face cathode active material layer 21C are formed by, for example, as follows. A cathode active material, an electrical conductor, and a binder are mixed. The mixture is dispersed in a disperse medium. The cathode current collector 21A is coated with the resultant, which is dried and compression-molded to form the cathode 21. In the same manner as the cathode 21, the anode 22 is formed by forming the outer face anode active material layer 22B and the inner face anode active material layer 22C on the anode current collector 22A. Then, the thickness and the position relation of the outer-face cathode active material layer 21B, the inner-face cathode active material layer 21C, the outer-face cathode active material layer 21B, and the inner-face cathode active material layer 21C are adjusted as described above. Next, the lead 25 is attached to the cathode current collector 21A by welding or the like, and the lead 26 is attached to the anode current collector 22A by welding or the like.

Subsequently, the cathode 21 and the anode 22 are spirally wound with the separator 23 in between. The center pin 24 is inserted in the center of the spirally wound electrode body. Then, according to this embodiment, the thickness of the inner-face cathode active material layer 21C is smaller than that of the outer-face cathode active material layer 21B. In addition, the outer active material region 21F provided with only the outer-face cathode active material layer 21B is arranged to be overlapped with the lead 25 to relax the step of the lead 25. Therefore, the generation of cracks and breaks are prevented in the inner-face cathode active material layer 21C. After that, the end of the lead 25 is welded to the safety valve mechanism 15, and the end of the lead 26 is welded to the battery can 11. The spirally wound cathode 21 and the spirally wound anode 22 are sandwiched between the pair of insulating plates 12 and 13, and contained inside the battery can 11. Next, the electrolytic solution is injected into the battery can 11, and impregnated in the separator 23. After that, the battery cover 14, the safety valve mechanism 15, and the PTC device 16 are fixed at the open end of the battery can 11 by being caulked with the gasket 17. The secondary battery shown in FIGS. 1 and 2 is thereby completed.

As above, according to this embodiment, the thickness of the inner-face cathode active material layer 21C is smaller than that of the outer-face cathode active material layer 21B. In addition, on the spirally-winding center side, the outer face active material region 21F provided with only the outer-face cathode active material layer 21B is provided to be overlapped with the lead 25 to relax the step due to the lead 25. Therefore, even when the thickness of the cathode 21 is increased, the generation of cracks and breaks are prevented. In the result, the capacity can be improved.

Second Embodiment

Figure 4:
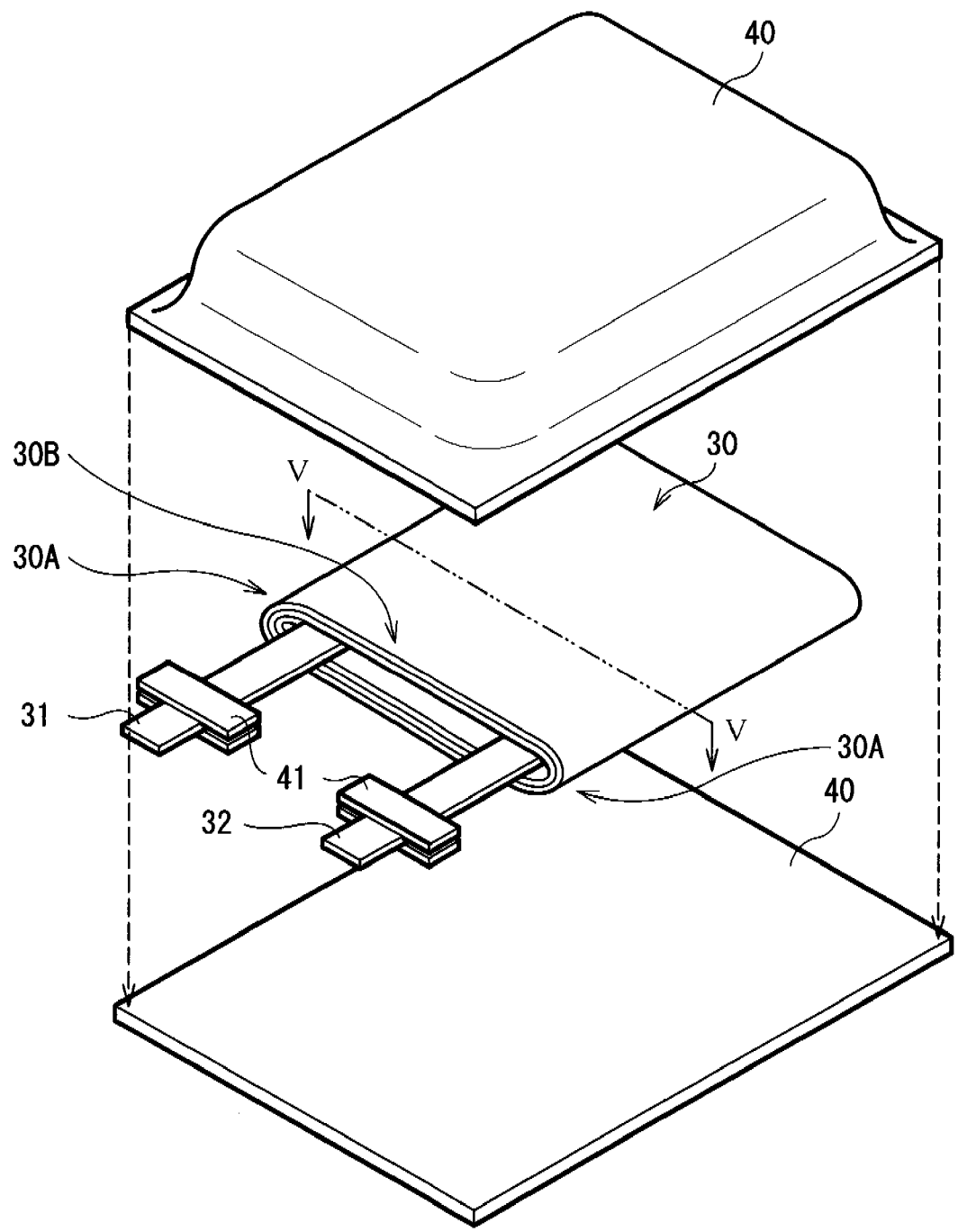
FIG. 4 is an exploded perspective view showing a structure of a secondary battery according to a second embodiment of the invention.

FIG. 4 shows a structure of a secondary battery according to a second embodiment of the invention. The secondary battery is a so-called laminated film type secondary battery. In the secondary battery, a spirally wound electrode body 30 to which leads 31 and 32 are attached is contained inside a film package member 40.

The leads 31 and 32 are directed from inside to outside of the package member 40 and, for example, are derived in the same direction. The leads 31 and 32 are respectively made of, for example, a metal material such as aluminum, copper, nickel, and stainless, and are in the shape of a thin plate or mesh.

The package member 40 is made of a rectangular aluminum laminated film in which, for example, a nylon film, an aluminum foil, and a polyethylene film are bonded together in this order. The package member 40 is arranged, for example, so that the polyethylene film side and the spirally wound electrode body 30 face each other, and the respective outer edges are contacted to each other by fusion bonding or an adhesive. Adhesive films 41 to protect from entering of outside air are inserted between the package member 40 and the leads 31 and 32. The adhesive film 41 is made of a material having contact characteristics to the leads 31 and 32, for example, is made of a polyolefin resin such as polyethylene, polypropylene, modified polyethylene, and modified polypropylene.

The package member 40 may be made of a laminated film having other structure, a polymer film such as polypropylene, or a metal film, instead of the foregoing aluminum laminated film.

Figure 5:
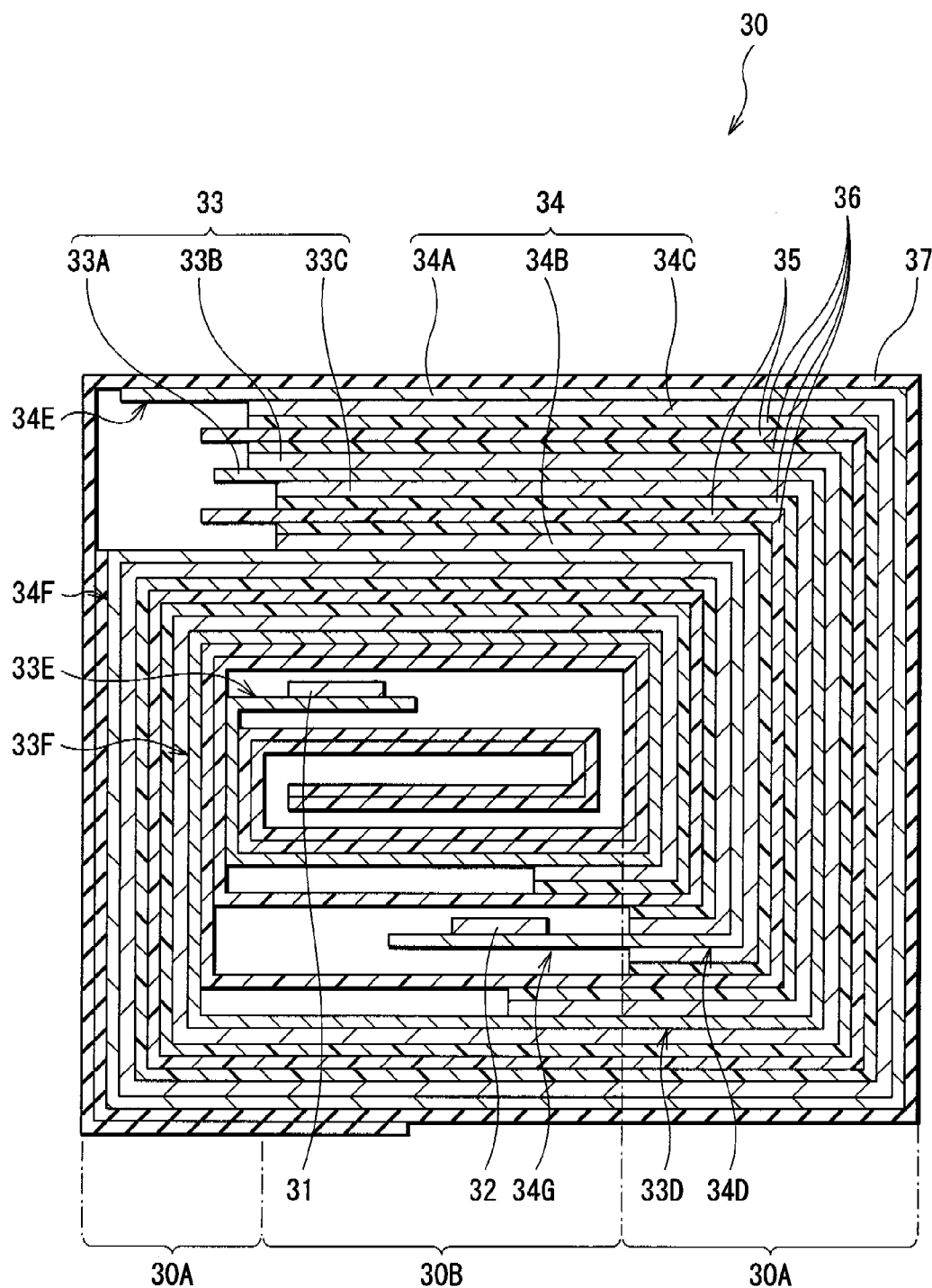
FIG. 5 is a cross section showing a structure taken along line V-V of a spirally wound electrode body shown in FIG. 4.

FIG. 5 shows a cross sectional structure taken along line V-V of the spirally wound electrode body 30 shown in FIG. 4. In the spirally wound electrode body 30, a cathode 33 and an anode 34 are layered with a separator 35 and an electrolyte layer 36 in between and spirally wound. The outermost periphery thereof is protected by a protective tape 37. Further, the spirally wound electrode body 30 has a planular shape including a pair of opposed bending portions 30A and a flat portion 30B between the pair of opposed bending portions 30A.

The cathode 33 has a structure in which an outer-face cathode active material layer 33B is provided on the spirally-winding outer face side of a cathode current collector 33A, and an inner-face cathode active material layer 33C is provided on the spirally-winding inner face side of the cathode current collector 33A. Structures of the cathode current collector 33A, the outer-face cathode active material layer 33B, and the inner-face cathode active material layer 33C are similar to those of the cathode current collector 21A, the outer-face cathode active material layer 21B, and the inner-face cathode active material layer 21C in the first embodiment.

That is, in the cathode 33, a both-faces active material region 33D provided with the outer-face cathode active material layer 33B and the inner-face cathode active material layer 33C is formed. The thickness of the inner-face cathode active material layer 33C is smaller than that of the outer-face cathode active material layer 33B. The thickness of the outer-face cathode active material layer 33B and the thickness of the inner-face cathode active material layer 33C are similar to the thickness of the outer-face cathode active material layer 21B and the thickness of the inner-face cathode active material layer 21C in the first embodiment. Further, the porosities of the outer-face cathode active material layer 33B and the inner-face cathode active material layer 33C are similar to that of the outer-face cathode active material layer 21B and the inner-face cathode active material layer 21C.

On the spirally-winding center side of the cathode 33, a both-faces exposed region 33E in which the outer-face cathode active material layer 33B and the inner-face cathode active material layer 33C are not provided and the both faces of the cathode current collector 33A are exposed is formed, and the lead 31 is attached thereto. Further, on the spirally-winding center side of the cathode 33, an outer face active material region 33F provided with only the outer-face cathode active material layer 33B is formed between the both-faces exposed region 33E and the both-faces active material region 33D.

The outer face active material region 33F is formed at least in the bending portion 30A. Thereby, a bending in the bending portion 30A is relaxed by the outer-face cathode active material layer 33B, and effect on the inner-face cathode active material layer 33C is decreased.

Figure 6:
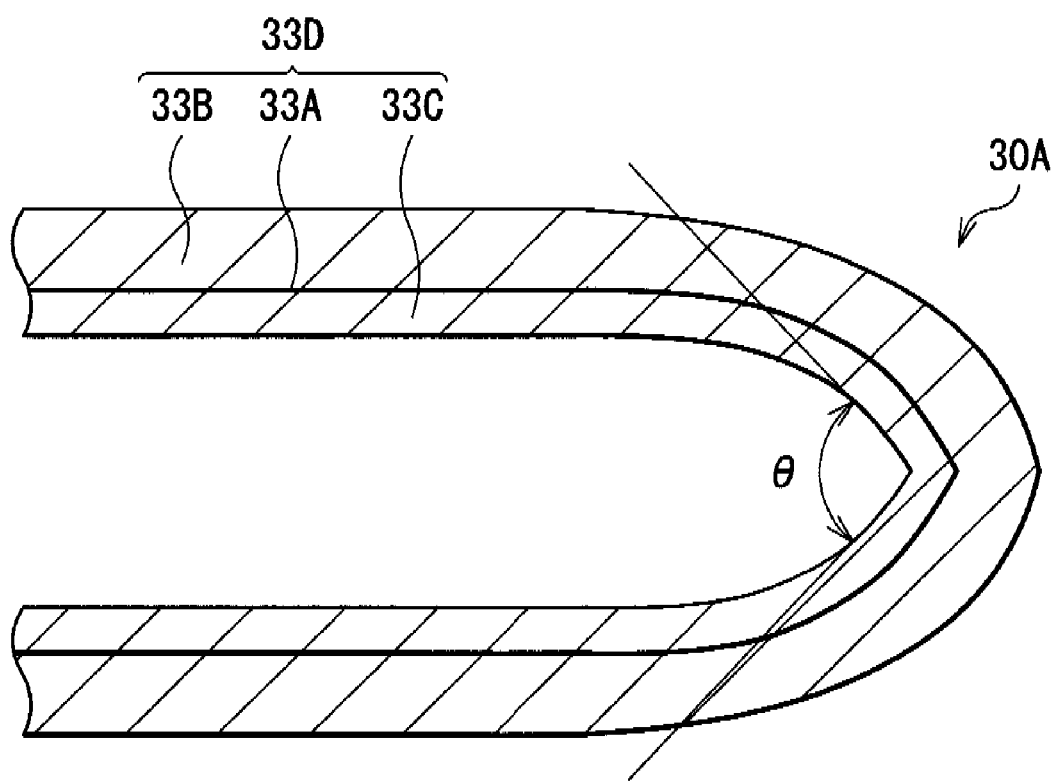
FIG. 6 is a cross section showing an enlarged part of the spirally wound electrode body shown in FIG. 5.

That is, as shown in FIG. 6, the both-faces active material region 33D is bent at the bending portion 30A. At this time, when the outer face active region 33F is provided, as the thickness of the outer-face cathode active material layer 33B of the outer face active material region 33F is increased, the diameter from the spirally-winding center of the bending portion 30A to the both-faces active material region 33D is increased. Thereby, the bending angle θ of the bending portion 30A is increased, and thus the stress is relaxed.

The anode 34 has a structure in which an outer face anode active material layer 34B is provided on the spirally-winding outer face side of an anode current collector 34A, and an inner face anode active material layer 34C is provided on the spirally-winding inner face side of the anode current collector 34A. In the same manner as in the cathode 33, in the anode 34, a both-faces active material region 34D provided with the outer face anode active material layer 34B and the inner face anode active material layer 34C is formed. The anode current collector 34A, the outer face anode active material layer 34B, and the inner face anode active material layer 34C are structured in the same manner as the anode current collector 22A, the outer face anode active material layer 22B, and the inner face anode active material layer 22C in the first embodiment.

If necessary, a both-faces exposed region 34E in which the both faces of the anode current collector 34A are exposed may be formed on the spirally-winding outer circumferential side of the anode 34. An inner face active material region 34F provided with only the inner face anode active material layer 34C is provided on the spirally-winding outer circumferential side of the anode 34.

On the spirally-winding center side of the anode 34, for example, a both-faces exposed region 34G in which the outer face anode active material layer 34B and the inner face anode active material layer 34C are not provided and the both faces of the anode current collector 34A are exposed is formed, and the lead 32 is attached thereto. Further, on the spirally-winding center side of the anode 34, though not shown, an one-face region provided with only the outer face anode active material layer 34B or the inner face anode active material layer 34C may be formed between the both-faces exposed region 34G and the both-faces active material region 34D.

The separator 35 is structured in the same manner as the separator 23 in the first embodiment.

The electrolyte layer 36 is so-called gelatinous, containing an electrolytic solution and a polymer compound to become a holding body that holds the electrolytic solution. The gelatinous electrolyte is preferable, since the high ion conductivity can be thereby obtained, and leakage of the battery can be thereby prevented. The structure of the electrolytic solution is similar to that of the first embodiment. As the polymer compound, for example, an ether polymer compound such as polyethylene oxide and a cross-linked body containing polyethylene oxide, an ester polymer compound such as polymethacrylate or an acrylate polymer compound, or a polymer of vinylidene fluoride such as polyvinylidene fluoride and a copolymer of vinylidene fluoride and hexafluoropropylene can be cited. One thereof is used singly, or two or more thereof are used by mixing. In particular, in view of redox stability, a fluorinated polymer compound such as the polymer of vinylidene fluoride is desirably used.

The secondary battery can be manufactured, for example, as follows.

First, in the same manner as in the foregoing first embodiment, the cathode 33 and the anode 34 are formed and are respectively coated with a precursor solution containing the electrolytic solution, the polymer compound, and a mixed solvent. The mixed solvent is volatilized to form the electrolyte layer 36. Next, the lead 31 is attached to the cathode current collector 33A, and the lead 32 is attached to the anode current collector 34A. Subsequently, the cathode 33 and the anode 34 formed with the electrolyte layer 36 are layered with the separator 35 in between to obtain a lamination. After that, the lamination is spirally wound in the longitudinal direction, the protective tape 37 is adhered to the outermost periphery thereof to form the spirally wound electrode body 30. After that, for example, the spirally wound electrode body 30 is sandwiched between the package members 40, and outer edges of the package members 40 are contacted by thermal fusion bonding or the like to enclose the spirally wound electrode body 30. At this time, the adhesive films 41 are inserted between the leads 31 and 32 and the package member 40. Thereby, the secondary battery shown in FIGS. 4 and 5 is completed.

Further, the secondary battery may be fabricated as follows. First, the cathode 33 and the anode 34 are formed in the same manner as in the foregoing first embodiment, and the leads 31 and 32 are respectively attached to the cathode 33 and the anode 34. After that, the cathode 33 and the anode 34 are layered with the separator 35 in between and spirally wound. The protective tape 37 is adhered to the outermost periphery thereof, and a precursor of the spirally wound electrode body 30 is formed. Next, the precursor is sandwiched between the package members 40, the outermost peripheries except for one side are thermally fusion-bonded to obtain a pouched state, and the precursor is contained inside the package member 40. Subsequently, an electrolytic composition containing an electrolytic solution, a monomer as a raw material for the polymer compound, and if necessary other material such as a polymerization initiator and a polymerization inhibitor is prepared, which is injected into the package member 40. After that, the opening of the package member 40 is thermally fusion-bonded and hermetically sealed. After that, the resultant is heated to polymerize the monomer to obtain a polymer compound. Thereby, the gelatinous electrolyte layer 36 is formed, and the secondary battery shown in FIGS. 4 and 5 is assembled.

The secondary battery works in the same manner as the secondary battery according to the first embodiment, and provides similar effects.

Examples

Further, specific examples of the invention will be described in detail.

As Examples 1 to 5, the cylindrical secondary batteries as shown in FIGS. 1 and 2 were fabricated. First, lithium cobaltate (LiCoO$_2$) as a cathode active material, graphite as an electrical conductor, and polyvinylidene fluoride as a binder were mixed to prepare a mixture. Subsequently, the mixture was dispersed in a disperse medium. Both faces of the cathode current collector 21A made of an aluminum foil and having a thickness of 15 μm were uniformly coated with the resultant, which was then dried. After that, the resultant was compression-molded to form the outer-face cathode active material layer 21B and the inner-face cathode active material layer 21C, and thereby the cathode 21 was formed. At that time, the thickness of the outer-face cathode active material layer 21B and the thickness of the inner-face cathode active material layer 21C were changed in Examples 1 to 5 as shown in Table 1 and the porosity thereof was set to 22%. Further, on the spirally-winding center side, the outer face active material region 21F formed with only the outer-face cathode active material layer 21B was formed. Next, the lead 25 made of aluminum was attached to the spirally-winding center side of the cathode current collector 21A. The position of the outer face active material region 21F and the lead 25 were adjusted to be overlapped with each other as shown in FIG. 2.

Further, a CoSnC-containing material was used as an anode active material. The CoSnC-containing material, artificial graphite and carbon black as an electrical conductor and an anode active material, polyvinylidene fluoride as a binder were mixed. The mixture thereof was dispersed in a disperse medium. The both faces of the anode current collector 22A made of a copper foil were coated with the resultant, which was dried and compression-molded to form the outer face anode active material layer 22B and the inner face anode active material layer 22C. Thereby the anode 22 was formed. At that time, the thickness of the outer face anode active material layer 22B and the thickness of the inner face anode active material layer 22C were changed in Examples 1 to 5 as shown in Table 1. Next, the lead 26 made of nickel was attached to the spirally-winding outer circumferential side of the anode current collector 22A.

The CoSnC-containing material was synthesized by mixing tin-cobalt alloy powder and carbon powder and by using mechanochemical reaction. The composition of the synthesized CoSnC-containing material was analyzed. In the result, the cobalt content was 29.3 wt %, the tin content was 49.9 wt %, and the carbon content was 19.8 wt %. The carbon content was measured by a carbon sulfur analyzer. The cobalt content and the tin content were measured by ICP (Inductively Coupled Plasma) optical emission spectroscopy. Further, regarding the obtained CoSnC-containing material, X-ray diffraction was performed. In the result, the diffraction peak having the wide half bandwidth with the diffraction angle 2θ of 1.0 degree or more was observed in the range of the diffraction angle 2θ=20 to 50 degrees. Further, when XPS (X-ray Photoelectron Spectroscopy) was performed for the CoSnC-containing material, the C1s peak in the CoSnC-containing material was obtained in the region lower than 284.5 eV. That is, it was confirmed that carbon in the CoSnC-containing material was bonded to other element.

Subsequently, the separator 23 made of a micro porous polypropylene film was prepared. Then, the cathode 21, the separator 23, the anode 22, and the separator 23 were layered in this order to form a lamination. After that, the lamination was spirally wound several times, and the center pin 24 was inserted in the center thereof. After that, the lead 25 was jointed to the safety valve mechanism 15, and the lead 26 was jointed to the battery can 11. The spirally wound cathode 21 and the spirally wound anode 22 were sandwiched between the pair of insulating plates 12 and 13, and contained inside the battery can 11. Next, an electrolytic solution was injected into the battery can 11. As the electrolytic solution, a solution obtained by dissolving 1 mol/dm$^3$ of LiPF$_6$ as an electrolyte salt in a mixed solvent of 50 volume % of ethylene carbonate and 50 volume % of diethyl carbonate was used. Subsequently, the safety valve mechanism 15, the PTC device 16, and the battery cover 14 were fixed at the open end of the battery can 11 by being caulked with the gasket 17. The secondary batteries of Examples 1 to 5 were thereby obtained.

Three secondary batteries were respectively fabricated for Examples 1 to 5, and the generation of cracks or breaks in the cathode 21 during the spirally winding step was observed. In the result, no cracks or breaks were found in all secondary batteries. The size of the step due to the lead 25 in Examples 1 to 5 was about 100 μm.

Figure 7:
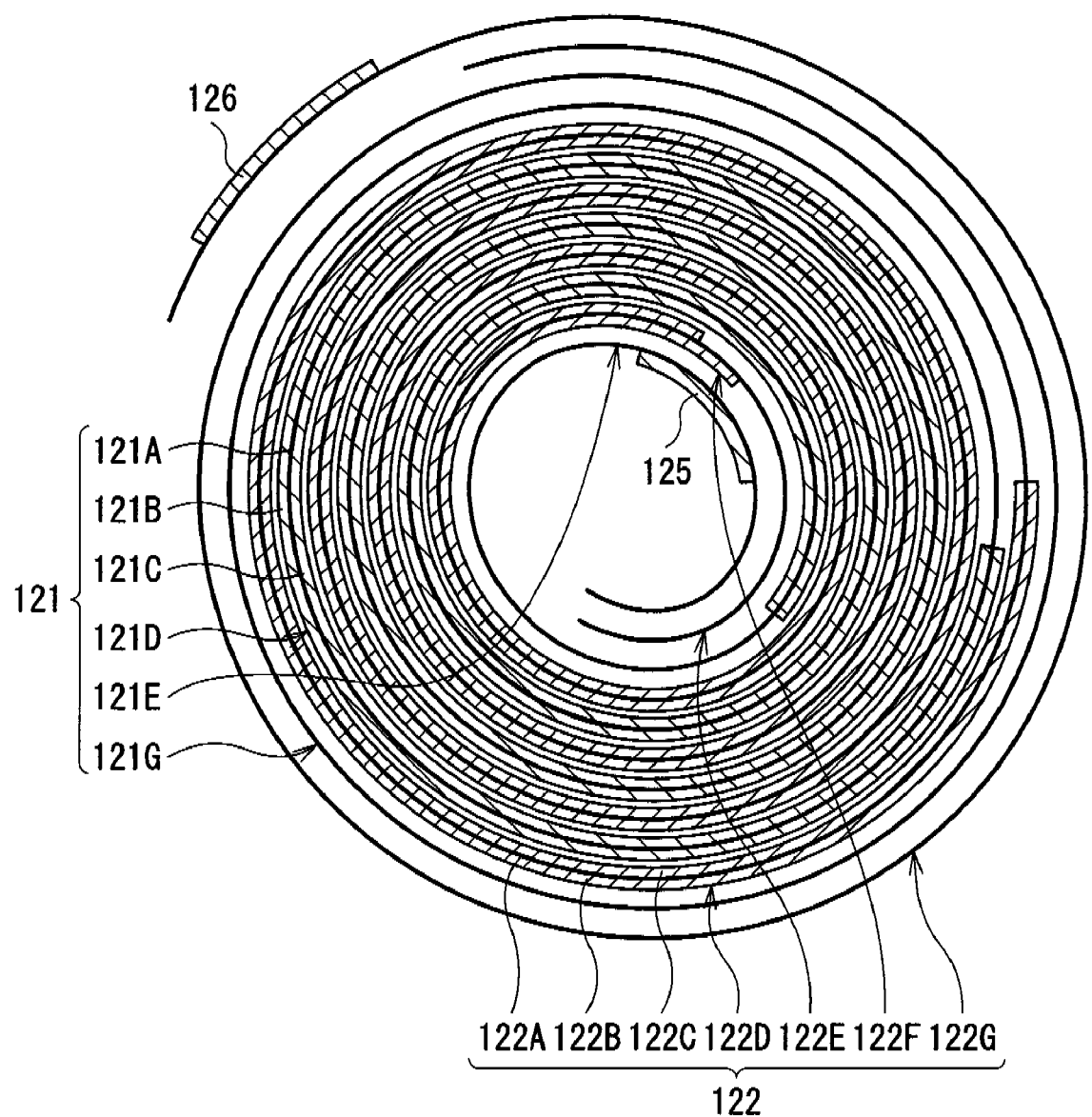
FIG. 7 is a cross section showing a spirally winding structure of Comparative example 3.

As Comparative examples 1 and 2, the secondary batteries were fabricated in the same manner as in Examples 1 to 5, except that the thickness of the outer-face cathode active material layer, the inner-face cathode active material layer, the outer face anode active material layer, and the inner face anode active material layer was changed as shown in Table 1, and the thickness of the outer-face cathode active material layer was identical with that of the inner-face cathode active material layer, and the thickness of the outer face anode active material layer was identical with that of the inner face anode active material layer. Further, as Comparative example 3, secondary batteries were fabricated in the same manner as in Examples 1 to 5, except that the end on the spirally-winding center side of the outer-face cathode active material layer 121B was aligned with that of the inner-face cathode active material layer 121C and the outer face active material region was not formed as shown in FIG. 7, and the thickness of the outer-face cathode active material layer 121B, the inner-face cathode active material layer 121C, the outer face anode active material layer 122B, and the inner face anode active material layer 122C was identical with those of Example 2 as shown in Table 1.

Three secondary batteries were also respectively fabricated for the Comparative examples 1 to 4, and the generation of cracks or breaks in the cathode during the spirally winding step was observed. In the result, no cracks or no breaks were found in Comparative examples 1 to 4. Meanwhile, cracks or breaks were generated in all secondary batteries of Comparative example 2. In Comparative example 3, cracks or breaks were generated in two secondary batteries.

For the fabricated secondary batteries of Examples 1 to 5 and Comparative examples 1, 3 and 4, after the discharge capacities at the first cycle and the 100th cycle were measured with the following method, the discharge capacity retention ratio was obtained. First, constant current and constant voltage charge was performed at the upper limit voltage of 4.2 V and at the current of 0.7 C until the total charge time from the start of charging reached 3 hours, and constant current discharge was performed at the current of 0.2 C and at the final voltage of 2.5 V to obtain the discharge capacity at the first cycle. Next, charge and discharge were performed under the same charge and discharge conditions until the total cycle number reached 100 cycles to obtain the discharge capacity at the 100th cycle. Finally, the discharge capacity retention ratio (%), discharge capacity retention ratio=(discharge capacity at the 100th cycle/discharge capacity at the first cycle)×100, was calculated. 0.7 C is the current value at which the battery capacity is completely discharged in (1/0.7) hour, and 0.2 C is the current value at which the battery capacity is completely discharged in 5 hours. The obtained results are shown in Table 1. The discharge capacity at the first cycle, the discharge capacity at the 100th cycle and the discharge capacity retention ratio shown in Table 1 are the average value of three secondary batteries. The same is applied to the followings unless stated. For Comparative example 2, since the cracks and the breaks were generated in the cathode, the discharge capacity retention ratio was not able to be obtained. For Comparative example 3, the discharge capacity retention ratio was obtained for 1 secondary battery in which no cracks and no breaks were generated.

As shown in Table 1, according to Examples 1 to 5, even when the thickness of the cathode 21 was increased, no cracks and no breaks were generated, and the discharge capacity at the first cycle could be improved. Further in Examples 1 to 5, the discharge capacity at the 100th cycle could be largely improved, and the discharge capacity retention ratio of equal to that of Comparative examples 1, 3 and 4 (85% or more) could be obtained. Meanwhile, in Comparative example 1 in which the thickness of the cathode was reduced, though no cracks and no breaks were generated, the discharge capacity at the first cycle was low. In Comparative example 2 in which the thickness of the outer-face cathode active material layer was increased identically with that of the inner-face cathode active material layer, and the outer face active material region was provided to be overlapped with the lead, and in Comparative example 3 in which the thickness of the inner face anode active material layer 122C was reduced, and the outer face active material region was not provided, cracks and breaks were generated.

That is, it was found out that when the thickness of the inner-face cathode active material layer 21C was smaller than that of the outer-face cathode active material layer 21B, and the outer face active material region 21F provided with only the outer-face cathode active material layer 21B was provided to be overlapped with the lead 25 on the spirally-winding center side, in the case where the anode active material contained at least one of tin and silicon as an element, the generation of cracks and breaks could be suppressed even when the thickness of the cathode 21 was increased, and thus the capacity could be improved.

Further, as evidenced by comparing Example 2 and Example 4, the higher discharge capacity at the first cycle could be obtained in Example 2. That is, it was found out that when the thickness of the outer face anode active material layer 22B was smaller than that of the inner face anode active material layer 22C, the capacity could be more improved.

TABLE 1

| | | Thickness (μm) | | | | Porosities of inner-face and outer-face cathode active material layers (%) | Thickness of cathode current collector (μm) | Breaks and cracks (pcs/3 batteries) | Discharge capacity (mAh) | | Discharge capacity retention ratio (%) |
|---|---|---|---|---|---|---|---|---|---|---|---|
| | | | | | | | | | First cycle | 100th cycle | |
| | Structure | Inner-face cathode active material layer | Outer-face cathode active material layer | Inner-face anode active material layer | Outer-face anode active material layer | | | | | | |
| Example 1 | FIG. 2 | 90 | 130 | 51 | 35 | 22 | 15 | 0 | 1080 | 937 | 86.8 |
| Example 2 | FIG. 2 | 95 | 125 | 49 | 37 | 22 | 15 | 0 | 1090 | 951 | 87.2 |
| Example 3 | FIG. 2 | 100 | 140 | 55 | 39 | 22 | 15 | 0 | 1105 | 947 | 85.7 |
| Example 4 | FIG. 2 | 95 | 125 | 49 | 49 | 22 | 15 | 0 | 1066 | 917 | 86.0 |
| Example 5 | FIG. 2 | 100 | 105 | 40 | 40 | 22 | 15 | 0 | 1070 | 921 | 86.1 |
| Comparative Example 1 | FIG. 2 | 80 | 80 | 32 | 32 | 22 | 15 | 0 | 1021 | 877 | 85.9 |
| Comparative Example 2 | FIG. 2 | 110 | 110 | 43 | 43 | 22 | 15 | 3 | — | — | — |
| Comparative Example 3 | FIG. 2 | 95 | 125 | 49 | 37 | 22 | 15 | 2 | 1086 | 941 | 86.6 |
| Comparative Example 4 | FIG. 2 | 110 | 110 | 43 | 43 | 22 | 20 | 0 | 1063 | 914 | 86.0 |

Anode active material: CoSnC-containing material

As Examples 6 to 10, the secondary batteries were fabricated in the same manner as in Example 1, except that the porosities of the outer-face cathode active material layer 21B and the inner-face cathode active material layer 21C, and the thicknesses of the outer-face anode active material layer 22B and the inner-face anode active material layer 22C were changed as shown in Table 2. At that time, the porosity was changed within the range from 18% to 29%.

For the fabricated secondary batteries of Examples 6 to 10, in order to examine the capacity under the high load condition (high-load discharge capacity), after constant current and constant voltage charge was performed at the upper limit voltage of 4.2 V and at the current of 0.7 C until the total charge time from the start of charging reached 3 hours, constant current discharge was performed at the current of 2 C and at the final voltage of 2.5 V to obtain the high-load discharge capacity at the first cycle. 2 C is the current value at which the battery capacity is completely discharged in 5 hours. The obtained results are shown in Table 2 together with the result of Example 1 and FIG. 8.

and the inner-face anode active material layer 22C were changed as shown in Table 3. For Example 11, three secondary batteries were fabricated and the generation of cracks or breaks in the cathode 21 during the spirally winding step was observed. In the result, no cracks and breaks were found in all secondary batteries. The size of the step due to the lead 25 in Example 11 was the same as Example 1.

As Comparative example 5 and 6, the secondary batteries were fabricated in the same manner as in Example 11, except that the thicknesses of the outer-face cathode active material layer, the inner-face cathode active material layer, the outer-face anode active material layer and the inner-face anode active material layer were changed as shown in Table 3, the thickness of the outer-face cathode active material layer was identical with that of the inner-face cathode active material layer, and the thickness of the outer face anode active material layer was identical with that of the inner face anode active material layer. As Comparative Example 7, the secondary batteries were fabricated in the same manner as in Comparative example 6, except that the porosities of the outer-face

TABLE 2

Anode active material: CoSnC-containing material

| | | Thickness (μm) | | | | Porosities of inner-face and outer-face | |
| --- | --- | --- | --- | --- | --- | --- | --- |
| | Structure | Inner-face cathode active material layer | Outer-face cathode active material layer | Inner-face anode active material layer | Outer-face anode active material layer | cathode active material layers (%) | High-load discharge capacity (mAh) |
| Example 6 | FIG. 2 | 90 | 130 | 54 | 37 | 18 | 919 |
| Example 7 | FIG. 2 | 90 | 130 | 52 | 36 | 20 | 992 |
| Example 1 | FIG. 2 | 90 | 130 | 51 | 35 | 22 | 1017 |
| Example 8 | FIG. 2 | 90 | 130 | 49 | 34 | 25 | 997 |
| Example 9 | FIG. 2 | 90 | 130 | 48 | 33 | 27 | 982 |
| Example 10 | FIG. 2 | 90 | 130 | 47 | 32 | 29 | 929 |

Figure 8:
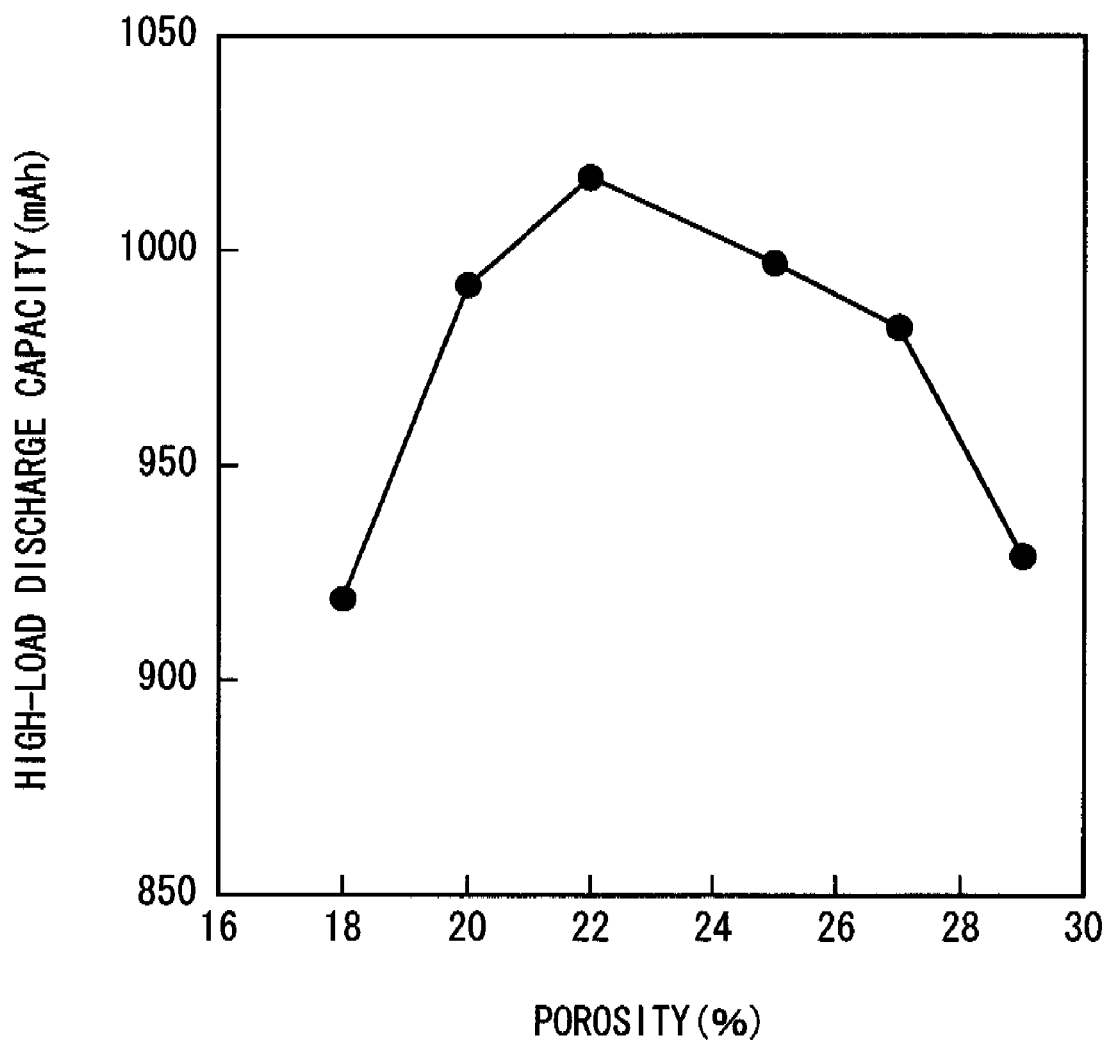
FIG. 8 is a characteristic view showing a relation between porosity and high-load discharge capacity.

As shown in Table 2 and FIG. 8, according to Examples 1 and 6 to 10, as the porosity increased, the high-load discharge capacity was increased and became almost constant, and then decreased. In that case, when the porosity was less than 20% or larger than 27%, the high-load discharge capacity was significantly decreased. That is, it was found out that when the porosities of the outer-face cathode active material layer 21B and the inner-face cathode active material layer 21C were within the range from 20% to 27%, the generation of cracks and breaks were suppressed and the capacity was improved, and furthermore, under the output with high-load current, the high capacity was maintained.

As Example 11, the secondary batteries were fabricated in the same manner as in Examples 1 to 5, except that artificial graphite was used as the anode active material-cum-conductive material and the thicknesses of the outer-face cathode active material layer 21B, the inner-face cathode active material layer 21C, the outer-face anode active material layer 22B cathode active material layer and the inner-face cathode active material layer were changed to 25%, and the thicknesses of the outer-face anode active material layer and the inner-face anode active material layer were changed to 80 μm.

For Comparative examples 5 to 7, three secondary batteries were fabricated and the generation of cracks or breaks in the cathode during the spirally winding step was observed. In the result, no cracks and no breaks were observed for all the secondary batteries of Comparative examples 5 and 7. Meanwhile, cracks or breaks were observed in 1 secondary battery of Comparative example 6.

For the fabricated secondary batteries of Example 11 and Comparative examples 5 to 7, as in the case of Examples 1 to 5, the discharge capacities at the first cycle and the 100th cycle were measured to obtain the discharge capacity retention ratio. The obtained results are shown in Table 3. For Comparative example 6, the discharge capacity retention ratio was obtained for two secondary batteries in which no cracks and no breaks were generated.

TABLE 3

Anode active material: graphite

| | Structure | Thickness (μm) | | | | Porosities of inner-face and outer-face cathode active material layers (%) | Breaks and cracks (pcs/3 batteries) | Discharge capacity (mAh) | | Discharge capacity retention ratio (%) |
| | | Inner-face cathode active material layer | Outer-face cathode active material layer | Inner-face anode active material layer | Outer-face anode active material layer | | | First cycle | 100th cycle | |
|---|---|---|---|---|---|---|---|---|---|---|
| Example 11 | FIG. 2 | 85 | 95 | 85 | 82 | 22 | 0 | 868 | 778 | 89.6 |
| Comparative Example 5 | FIG. 2 | 70 | 70 | 65 | 65 | 22 | 0 | 845 | 784 | 92.8 |
| Comparative Example 6 | FIG. 2 | 90 | 90 | 84 | 84 | 22 | 1 | 885 | 641 | 72.4 |
| Comparative Example 7 | FIG. 2 | 90 | 90 | 80 | 80 | 25 | 0 | 862 | 666 | 77.3 |

As shown in Table 3, according to Example 11, even when the thickness of the cathode 21 was increased, no cracks and breaks were generated, and the discharge capacities at the first and 100th cycle could be largely improved. Further, in Example 11, the discharge capacity retention ratio of equal to or more than Comparative examples 5 to 7 could be obtained. Meanwhile, in Comparative example 5 in which only the thickness of cathode was reduced, no cracks and breaks were generated, but the discharge capacity at the first cycle was low. Further, in Comparative example 6 in which the thickness of the outer-face cathode active material layer was identical with that of the inner-face cathode active material, cracks and breaks were generated. Furthermore, in Comparative example 7 in which the porosity was increased, no cracks and breaks were generated, but the discharge capacity at the first cycle was low.

That is, it was found out that when the thickness of the inner-face cathode active material layer 21C was smaller than that of the outer-face cathode active material layer 21B, and the outer-face active material region 21F provided with only the outer-face cathode active material layer 21B was provided to be overlapped with the lead 25 on the spirally-winding center side, in the case where the anode active material contained carbon material, the generation of cracks and breaks could be suppressed even when the thickness of the cathode 21 was increased, and thus the capacity could be improved.

As evidenced from the results shown in Tables 1 to 3, it was found out that irrespective of the material of the anode active material, when the thickness of the inner-face cathode active material layer 21C was smaller than that of the outer-face cathode active material layer 21B and the outer-face active material region 21F provided with only the outer-face cathode active material layer 21B was provided to be overlapped with the lead 25 on the spirally-winding center side, the generation of cracks and breaks could be suppressed even when the thickness of the cathode 21 was increased, and thus the capacity could be improved. In particular, in the case where the anode active material contained at least one of tin and silicon, which have advantages for increasing capacity, as an element, higher effect could be obtained. In the case where the spirally winding body 30 having a planar shape shown in FIGS. 4 and 5 was included, when the thickness of the inner-face cathode active layer 33C was smaller than that of the outer-face cathode active material layer 33B, and the outer-face active material region 33F was provided in the bending portion 30A on the spirally-winding center side, the same effects as the spirally wound electrode body 20 could be obtained.

The invention has been described with reference to the embodiments and the examples. However, the invention is not limited to the embodiments and the examples, and various modifications may be made. For example, in the foregoing second embodiment, the description has been specifically given of the case that the planular spirally wound electrode body 30 including the pair of opposed bending portions 30A and the flat portion 30B between the pair of bending portions 30A is contained in the package member 40 made of the aluminum laminated film. However, the invention can be also applied to a so-called square type battery in which the spirally wound electrode body 30 is contained in a can made of iron (Fe) plated with nickel (Ni) or the like. In this case, a gelatinous electrolyte layer 36 is not provided, and an electrolytic solution is injected into the can and impregnated in the separator in the same manner as in the first embodiment.

Further, in the foregoing embodiments and the foregoing examples, the descriptions have been given specifically of the materials of the cathode 21, the anode 22, the electrolytic solution and the like. However, in the invention, other material may be used as long as the foregoing spirally winding structure is used. Further, the invention can be applied not only to the secondary battery, but also to other battery such as a primary battery similarly.

It should be understood by those skilled in the art that various modifications, combinations, sub-combinations and alternations may occur depending on design requirements and other factors insofar as they are within the scope of the appended claims or the equivalents thereof.

What is claimed is:

1. A battery comprising:
   a cathode;
   an anode; and
   a separator in between the cathode and anode,
   wherein,
   the cathode, the anode and the separator are spirally wound to form a spirally wound electrode body,
   the cathode has a cathode current collector having (1) an outer face that faces away from the center of the spirally wound electrode body (2) an inner-face that faces towards the center of the spirally wound electrode body, the outer face and inner face being on opposite sides of the cathode current collector, an outer-face cathode active material layer on the outer face of the cathode current collector, an inner-face cathode active material layer on the inner face of the cathode current collector, the current collector has an exposed surface without an outer-face cathode active material and an inner-face cathode material thereon, a lead attached to the exposed surface of the current collector on a side of the current collector that faces towards the center of spirally wound electrode body, a thickness of the inner-face cathode active material layer is smaller than a thickness of the outer-face cathode active material layer, an outer face region of the spirally wound electrode body that faces the center the spirally wound electrode body, only the outer-face cathode active material layer on the outer face of the spirally wound electrode body, and wherein the porosities of the outer-face cathode active material layer and the inner-face cathode active material layer are within the range from 20% to 27%, and the outer face region overlaps the lead on the center side of the spirally wound electrode body.

2. The battery according to claim 1, wherein the anode has an anode current collector having (1) an outer face that faces away from the center of the spirally wound electrode body and (2) an inner face that faces towards the center of the spirally wound electrode body, the outer face and the inner face being on opposite sides of the current collector, an anode active material layer on the outer face side of the anode current collector, an inner face anode active material layer on the inner face side thereof, and a thickness of the outer face anode active material layer is the same as a thickness of the inner face anode active material layer, or smaller than the thickness of the inner face anode active material layer.

3. The battery according to claim 1, wherein the anode contains an anode active material containing at least one of tin and silicon as an element.

* * * * *